March 31, 1964  A. L. ELDREDGE  3,127,608
OBJECT CAMOUFLAGE METHOD AND APPARATUS
Filed Aug. 6, 1956
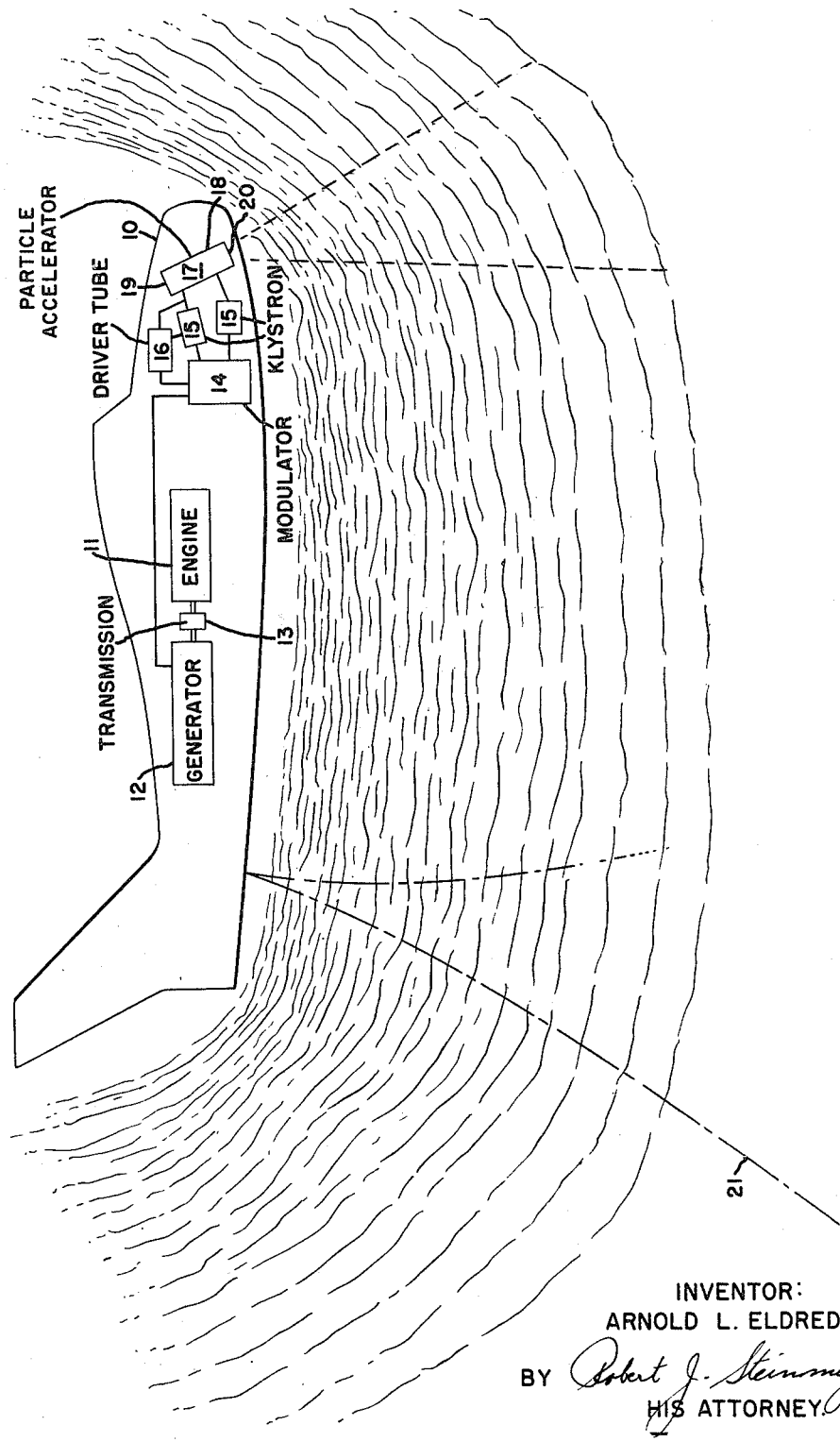
INVENTOR:
ARNOLD L. ELDREDGE,
BY *Robert J. Steinmeyer*
HIS ATTORNEY

United States Patent Office 3,127,608
Patented Mar. 31, 1964

3,127,608
OBJECT CAMOUFLAGE METHOD AND
APPARATUS
Arnold L. Eldredge, Woodside, Calif., assignor to General
Electric Company, a corporation of New York
Filed Aug. 6, 1956, Ser. No. 602,400
10 Claims. (Cl. 343—18)

This invention relates to a method of camouflaging an object or more particularly to a method of making aircraft or other craft or objects imperceptible to radar.

It is old to disguise the location of aircraft by scattering tinfoil in order to enlarge the area on the radar screen to which the signal is returned. This method of camouflage has the obvious disadvantage of still allowing the radar to detect presence of an object. In order to completely disguise the presence of an aircraft it is desirable to completely eliminate or substantially minimize or attenuate the response on the radar screen due to the presence of aircraft by substantially eliminating any return signal. In order to do this it is necessary to either refract the radar beam in a direction away from the object or the receiver or to absorb the beam in order to prevent its return to the receiver. These ends cannot be achieved by means of existing techniques and it is therefore an object of my invention to refract or absorb the radar signal impinging upon an object.

Another object of my invention is to insert a media between an aircraft and a radar detection set which will refract or absorb incident radar beams.

A more specific object of my invention is to obscure aircraft to radar with a cloud of ionization which will both refract and absorb incident radiation.

Another specific object of my invention is to provide an aircraft with a particle accelerator capable of providing a sufficiently dense cloud of ionization adjacent to the aircraft in order to refract or absorb substantially all radiation due to incident radar beams utilizing energies presently obtainable by current radar detection sets.

In carrying out my invention in one form thereof a linear electron accelerator or other particle accelerator is positioned in the forward part of the aircraft in a manner such as will allow it to emit radiation forward and downward from the aircraft in order to ionize the air beneath the aircraft. A sufficiently high energy is imparted to the particles by the accelerator to allow them to not only free electrons from air molecules by collision therewith, but also to impart sufficient energy to these electrons so that the electrons in turn will cause further ionization through a series of collisions which will only end when the final electrons have reached an energy level beneath that required to produce further ionization or electrons due to collision. Due to the forward motion of the aircraft this ionization cloud will then move to the rear of the craft, the accelerator constantly replacing the forward part of the cloud in order to completely obscure the aircraft to radar. The amount of ionization produced must be sufficient to substantially absorb or refract an incident radar beam regardless of the effects of the life of the thermal electrons, or recombination rate, and the rate of electron attachment to neutral oxygen molecules. Electron attachment occurs when an electron strikes an oxygen molecule with sufficient energy to form $O_2$ minus.

Modified forms of my invention may include particle accelerators for accelerating any suitable high energy particle other than the linear electron accelerators that are currently well known in the art. Also, a plurality of accelerators may be used, positioned judiciously in order to more completely obscure the object with a given amount of energy expended. Examples of known accelerators can be found by referring to the following: U.S. Patent 2,144,518 to Westendorp, assigned to the assignee of the present invention, could be adapted by removing target 34 and replacing it with an electron permeable window. British I.R.E., vol. 14, 1954, pp. 361–375, Miller, C. W., "Industrial Radiography and the Linear Accelerator," describes a 4 m.e.v. linear electron accelerator. I.E.E. Proceedings, Part B, March 1956, pp. 132–145, Chick, D.R. and Petrie, D.P.R.—"An Electrostatic Particle Accelerator," presents a typical type of electrostatic accelerator.

The novel features which are believed to be characteristic of my invention are set forth with particularity in the appended claims. My invention itself, however, together with further objects and advantages thereof can best be understood by reference to the following description taken in connection with the accompanying drawing which illustrates in block diagram form a preferred embodiment of the apparatus of my invention.

Referring now to the drawing I have illustrated an aircraft 10, one engine 11 of which is shown connected to a generator 12 through a transmission 13. The power of the generator 12 is fed to a modulator 14 which is connected to a number of klystrons 15 and a driver tube 16. Driver tube 16 is also connected to the klystrons 15. Klystrons 15 are connected to a linear electron accelerator 17. In order to effect complete coverage of the aircraft by the ionization cloud it may be desirable to employ more than one accelerator such as that shown at 17, directed judiciously, as for example, from the body of the aircraft 10 or from its wings. The engine 11 may be one of the engines normally employed on the aircraft, which can be used to supply motive power during take-off and later coupled to generator 12 through transmission 13 when it is desired to generate the ionization cloud. The accelerator 17 includes a central interacting structure 18, an end 19 into which electrons are injected and an electron permeable window 20.

The operation of the embodiment shown in the drawing is as follows: After the aircraft 10 has taken-off and attained the proper altitude, upon approaching the location at which it is desired to obscure the craft from radar, the engine 11 is diverted from its normal duties and coupled through transmission 13 to generator 12 in order to supply energy to modulator 14. Modulator 14 is a device to form pulses of voltage by utilizing the energy provided from generator 12. Thus, modulator 14 provides the necessary wave form to supply the anode voltage to klystrons 15. Klystrons 15 are for the purpose of converting the low frequency energy from the modulator to microwave frequency that is in the region of 1000 to 10,000 megacycles per second. The driver tube 16 is an oscillator driver that provides the drive power required for the klystron amplifiers 15. The linear accelerator interaction structure 18 is used for the purpose of converting the high energy microwave power into high energy electron energy. It accomplishes this by having a microwave circuit that allows electrons that are injected at one end 19 to be properly phased with the RF wave that is caused to travel down the interaction structure 18 as a result of coupling between the klystrons 15 and the accelerator 17. Thus, the linear accelerator interaction structure 18 produces electrons whose energy is sufficient to cause a thin metal window 20 at the end of the interaction structure 18 to appear transparent to electrons. This mechanism then allows the ejection into the atmosphere of high energy electrons which can produce the necessary ionization in the vicinity of the aircraft 10. The ionization thus created is approximately inversely proportional to the square of the distance from the plane. More specifically, the radiation falls off approximately as follows: if, for example, 2 units from the plane the ionization density has a percentage of $x$, at a point 4 units from the plane, the ionization density percentage will be $x/4$. The factors determining the required ionization densities are discussed below.

The utility of such a cloud of ionization comes about from two principal effects that it has on an impinging detecting radar wave. This may be clearly illustrated from observing ray path 21 in the drawing. The impinging ray 21 suffers a small refraction due to the fact that the refractive index of the ionized medium is less than 1, and more importantly suffers appreciable attenuation due to the free electrons in the halo. This attenuation is due to energy lost by interaction between the beam and the electrons in setting the electrons in motion. It may be seen from the radar wave ray path 21 that a small refraction takes place, the wave continues on and strikes the plane, and then diminishes to some low value or essentially zero as it emerges from the ionization cloud. The ionization cloud has the novel characteristic of obviating or nearly obviating reflections and scattering by having a very smooth transition from ordinary atmosphere to the ionized atmosphere.

In order to maintain the ionization cloud in a condition which will provide sufficient absorption the following requirements must be met: The power required to maintain the ionization cloud is dictated by the speed of the aircraft and the life of the thermal electrons. As stated previously two processes lead to the capture or loss of the thermal electrons. These are the electron recombination with positive ions and the electron attachment to oxygen molecule. The data used concerning the recombination rate and rate of electron attachment represents orders of magnitude rather than exact data as little exact data exists about these processes.

Calculations indicate that to produce 100 db radar attenuations on an airplane having a wing span of 50 meters and a speed of 300 meters per second requires 10 kilowatts average power if oxygen attachment is negligible but that as much as one megawatt is required if oxygen attachment is as rapid as theory predicts. The ionization cloud scatters a certain amount of radiation backwards even as it refracts and absorbs radiation. However, this will be insignificant unless there are appreciable fluctuations in the density of the electrons within distances of the order of a wavelength of the impinging radar radiation.

Altitude effects are of second order of importance, that is, the effectiveness of the method is not expected to vary appreciably within the range of expected operational altitudes.

The foregoing can be set out in equation form as follows: The propagation of electromagnetic waves in an ionized medium is governed by the equation:

$$\nabla \psi + \left(\frac{n^2 \omega^2}{c^2}\right)\psi = 0$$

where $\nabla^2$ is the scalar Laplacian operator
$\psi$=the electric field (volts per meter)
$\omega = 2\pi f$ (signal frequency in radians per second)
$c$=velocity of light $$n^2 = \left[1 - \left(\frac{\omega_p}{\omega}\right)^2 \frac{1}{1+b^2}\right] - j\left(\frac{\omega_p}{\omega}\right)^2 \frac{b}{1+b^2}$$

$$\omega_p = \left(\frac{Ne^2}{m\epsilon_0}\right)^{1/2}$$

$N$=free electron density
$e$=electronic charge
$m$=electronic mass
$\epsilon_0$=dielectric coefficient of free space $$b = \frac{f_c}{\omega}$$

$\omega_p$=the plasma frequency $f_c$=collision frequency of an electron with heavier air particles
$\quad = n_a \overline{V}_e \sigma$
$n_a$=number of air molecules per unit volume
$\overline{V}_e$=average electron velocity
$\sigma$=collision cross section for electrons with air molecules Roughly speaking, the real part of $n$ accounts for refraction and the imaginary part for absorption. Heavy ions do not appreciably affect the propagation of waves because the deviation of $n^2$ from unity depends inversely upon the mass of the charged particles.

If the absorption is neglected ($b=0$), refraction may be treated simply by the methods of geometrical optics. If the detecting radar ray is to suffer large deflection so that negligible power strikes the airplane, it is necessary that $n^2$ approach 0 at the reflecting surface. Further the ionization halo, for this case, has to be large compared to the dimensions of the craft envolved. For a detecting radar frequency of 10,000 mcs., this would require an electron density, in the ionization ball, at the airplane of about $10^{18}$ electrons per cubic meter. This is much greater than the electron density required for absorption and would by comparison lead to greater power requirements. Additionally since $n^2$ is frequency dependent it appears difficult to design an ionization cloud that would refract satisfactorily for all frequencies.

Taking the collision cross section to be $6 \times 10^{-16}$ cm.$^2$ the collision rate $f_c$ for thermal electrons turns out to be about $1.5 \times 10^{11}$ per second at sea level. For a frequency of 10,000 mcs. this gives a $b=2.5$. At higher altitudes, the air density, and hence $b$, decreases; for example, at an elevation of 10 km., $b$ would be about 0.9 and at 20 km. it would be about 0.2. The collision cross section is not well known, so these values have only an order of magnitude significance. However, they do indicate the range of values accessible to aircraft.

The absorption coefficient A, in db per meter, is given by:

$$A = -8.686\left(\frac{\omega}{c}\right) Imn$$

wherein, $Imn$ is the imaginary part of the index of refraction in the wave equation. For not too large electron densities, the deviation of $n^2$ from unity is small and $$-Imn \simeq \tfrac{1}{2}\left(\frac{N}{N_0}\right)\left(\frac{b}{1+b^2}\right)$$

where $$N_0 = \frac{\omega^2 m \epsilon_0}{e^2}$$

If X is the distance from a point on the airplane measured toward the radar transmitter, the total two-way attenuation experience by an impinging detecting radar wave is therefore:

$$8.686\left(\frac{\omega}{N_0 c}\right)\left(\frac{b}{1+b^2}\right)\int_0^\infty N(x)dx$$

From the foregoing equation, it therefore seems that the total attenuation depends only on the total number of electrons between the transmitter and the airplane, and not on their actual distribution in space. The total attenuation decreases with increased frequency. Therefore, if 100 db is obtained at 10,000 mcs., a higher attenuation will be attained at all lower frequencies. The optimum attenuation occurs for $b=1$, which is within the range of attainable values; under this optimum condition, the required value of $$\int_0^\infty N dx$$

turns out to be $1.35 \times 10^{17}$ electrons per square meter for 100 db attenuation at 10,000 mcs. This is considerably smaller than the electron density required for refraction.

Neglecting the combination of electrons with positive ions or neutral molecules, it is now possible to estimate the total number of electrons required and the power necessary to produce them. Taking the wing span to be 50 meters and the velocity to be 300 meters per second, it turns out that approximately $2 \times 10^{21}$ free electrons per second must be created at the aircraft in order that the bottom of the plane have a column of $1.35 \times 10^{17}$ electrons per square meter between it and the detecting radar. Since the creation of each free electron requires at least 32 electron volts, the power requirement is about 10 kw. This is a minimum power requirement, because some of the electrons will be lost by combining with air molecules and they will have to be replaced.

The minimum requirements arrived at in the preceding paragraph were based on the assumption that electrons are not captured while the airplane is passing by the halo. Taking the length of the airplane to be about 50 meters, and assuming a speed of 300 meters per second, this means that the capture life time must be at least ⅙ of a second. As previously stated there are two processes that are known to lead to the capture of thermal electrons. These are the familiar electron combination with positive ions and the less familiar electron attachment to oxygen molecules. Electron attachment to nitrogen molecules does not seem to occur. Unfortunately, very little data exists about these processes.

Assuming the existence of equal numbers of electrons and positive ions, the rate of loss of electrons due to their process is given by:

$$\frac{dN}{dt} = -\alpha N^2$$

where $\alpha$ is the coefficient of recombination. This equation is easily integrated, giving $$N = \frac{N_0}{1 + N_0 \alpha t}$$

where $\alpha \cong 10^{-12}$ cubic meters/sec.

This means that if $N_0$ is $16^{16}$ per cubic meter, the electron density decreases to one-half its initial value in $10^{-4}$ seconds. For smaller electron densities the fractional rate of decay is smaller. After one-tenth second the density is less than $10^{13}$ electrons per cubic meter no matter how large the density was initially. With reasonable energies for the original electron beam, it is theoretically possible to obtain an electron cloud up to 100 meters thick. To obtain the required absorption this would mean the average value of N would have to be about $10^{15}$; recombination would lower this to $10^{14}$ and thus cut the attenuation to 10 db in about one one-hundredth of a second.

Occasionally when an electron strikes an oxygen molecule it will attach itself to form $O_2$ minus. As pointed out previously, there is very little data on this process for thermal electrons. It is estimated that this cross section is about $1.2 \times 10^{-22}$ cm². Under conditions of maximum absorption, $f_c$ is $2\pi \times 10^{10}$, so that the collision rate leading to attachment with oxygen molecules is about 2000 per second. The average life of a thermal electron may thus be small since the predicted life is of the order of 500 microseconds. During 500 microseconds an airplane at the assumed velocity of 300 meters per second, would travel only about 6 inches. Accordingly the motion of the airplane can be neglected and the power requirements can be estimated in another way. Further, we will ignore loss of electrons by recombination with positive ions in this power computation since the above estimate indicates that electrons lost by recombination are far less important than those lost by attachment to oxygen molecules. Assuming the cross sectional area of the plane as viewed from the ground to be 500 square meters, there must be present at all times about $10^{20}$ free electrons. Because of the capture process, free electrons would have to be supplied at the rate of $2 \times 10^{23}$ per second which is about 100 times faster than was estimated previously. This then means that the power required increases to 1 megawatt. Not much advantage is gained by flying at a greater altitude than given by the optimum absorption. For example, if $f_c$ were reduced by a factor of ten, about five times as many electrons would be required to get the same absorption; accordingly, although the rate of disappearance of the electrons is reduced by a factor of ten, the overall power requirement is reduced only by a factor of 2.

It will be obvious to anyone skilled in the art that the linear accelerator 17 of the drawing and the remainder of the circuits associated with the accelerator 17 may be replaced by any other well known particle accelerating means which will cause sufficient ionization of the atmosphere around the aircraft 10 in order to obscure it from radar, thus while I have shown a particular embodiment of my invention it will be understood of course, that I do not wish to be limited thereto since many modification may be made and I therefore contemplate by the appended claims to cover any such modifications as fall within the true spirit and scope of my invention.

What I claim as new and desire to secure by Letters Patent of the United States is:

1. In combination, an object, generating means associated with said object, ionizing means for producing a cloud of ionized gas, said ionizing means including a particle accelerating means adapted to be driven by said generating means, said particle accelerating means being positioned so as to produce a cloud of ionized atmosphere between said object and a radar detection means which ionized cloud diminishes in density with distance from said object to provide a smooth transition between ionized and un-ionized atmosphere.

2. The combination of claim 1 in which said generating means includes a modulator, a plurality of klystron tubes and a driver tube, said modulator supplying modulated energy to said klystron tubes and said driver tube, said driver tube driving said klystrons and said klystrons being connected to said particle accelerating means in order to provide microwave energy thereto.

3. Apparatus for rendering an object invisible to radar comprising electrical energy generating means, ionizing means to produce a cloud of ionized gas having a density approximately inversely proportional to the square of the distance from said ionizing means, said ionizing means including a particle accelerating means adapted to be driven by said generating means, said particle accelerating means being directed so as to ionize a cloud of the atmosphere between the object and radar detection means.

4. A method of obscuring an aircraft from enemy radar comprising ejecting ionizing particles forward and downward from said aircraft in a manner to ionize the atmosphere and maintaining a rate of ionization sufficient to form a cloud of ionization from a point in the front of said aircraft to a point in the rear of said aircraft, the cloud of ionization having a density which is an inverse function of distance from said aircraft and a sufficient number of particles ionized to substantially completely absorb any impinging radar beams.

5. The method of camouflaging an object from detection by radar which comprises producing a multiplicity of free electrons in the atmosphere around a substantial portion of the object and between the object and the radar detection means, the refractive index of the portion of the atmosphere including said free electrons ranging gradually from less than one at its outer periphery to lower indices adjacent said object.

6. The method of rendering an object invisible to detection by radar which comprises generating an ionization cloud around a substantial portion of the object and between the object and the radar detection means, said cloud having a refractive index which varies gradually from less than one at its outer periphery to lower indices adjacent to said object.

7. The method of rendering an object invisible to detection by radar which comprises generating an ionization cloud around a substantial portion of the object and between the object and the radar detection means, the density of ionization of said cloud diminishing in density as a function of distance from said object, and said cloud containing sufficient particles to substantially attenutate incident radar beam energy.

8. The method of rendering an object invisible to detection by radar which comprises generating an ionization cloud around a substantial portion of the object and between the object and the radar detection means, the density of ionization of said cloud diminishing in density as a function of distance from said object, and said cloud containing sufficient particles to substantially absorb all incident radar beam energy.

9. The method of rendering an object invisible to detection by radar which comprises generating an ionization cloud around a substantial portion of the object and between the object and the radar detection means, said cloud having a refractive index which varies gradually from less than one at its outer periphery to lower indices adjacent to said object and said cloud containing sufficient particles to substantially absorb all incident radar beam energy, in order to prevent back scattering of incident radar beams and to substantially eliminate the radar echo.

10. The method of obscuring an object from the incident electromagnetic waves of a radar system which comprises producing a cloud of ionized gas around a substantial portion of the object having a density of ionization which diminishes in density as a function of distance from said object whereby incident electromagnetic waves are substantially entirely attenuated and refracted.

References Cited in the file of this patent
UNITED STATES PATENTS

| | | |
|---|---|---|
| 2,144,518 | Westendrop | Jan. 17, 1939 |
| 2,333,975 | Bennett | Nov. 9, 1943 |
| 2,407,250 | Busignies | Sept. 10, 1946 |
| 2,632,326 | Stuart | Mar. 24, 1953 |
| 2,703,882 | Wilkes | Mar. 8, 1955 |
| 2,760,055 | Laster | Aug. 21, 1956 |
| 2,828,484 | Skellett | Mar. 25, 1958 |
| 2,850,641 | Martin | Sept. 2, 1958 |

FOREIGN PATENTS

| | | |
|---|---|---|
| 22,711 | Australia | May 21, 1936 |
| 696,202 | Great Britain | Aug. 26, 1953 |

OTHER REFERENCES

Marcus et al.: "Elements of Radio," 1948, 2nd. Ed., Prentice-Hall, Inc., page 504.

Eshleman: "Theory of Radio Reflections from Electron-Ion Clouds" IRE Transactions—Antenna and Propogation, p. 32–39 January 1955.

Klass: "Meteor Burst Extends VHF Radio Range" Aviation Week, June 17, 1957, pp. 96, 97, 99, 101.